United States Patent [19]

Casagrande et al.

[11] Patent Number: 5,185,424
[45] Date of Patent: Feb. 9, 1993

[54] THERMOTROPIC POLYESTERAMIDES

[75] Inventors: Francesco Casagrande; Marco Foa'; Larry L. Chapoy, all of Novara, Italy

[73] Assignee: Himont Italia S.r.l., Milan, Italy

[21] Appl. No.: 620,786

[22] Filed: Dec. 3, 1990

[30] Foreign Application Priority Data

Dec. 6, 1989 [IT] Italy .................. 22627 A/89

[51] Int. Cl.$^5$ .................. C08G 63/00; C08G 63/02; C08G 63/18
[52] U.S. Cl. .................. 528/183; 528/176; 528/183
[58] Field of Search .......... 528/176, 193, 183

[56] References Cited

U.S. PATENT DOCUMENTS

| | | | |
|---|---|---|---|
| 4,351,917 | 9/1982 | Calundann et al. | 528/183 |
| 4,351,918 | 9/1982 | Charbonneau et al. | 524/602 |
| 4,355,132 | 10/1982 | East et al. | 524/602 |
| 4,722,993 | 2/1988 | Hisgen et al. | 528/183 |
| 4,727,129 | 2/1988 | Hisgen et al. | 528/171 |
| 4,727,131 | 2/1988 | Kock et al. | 528/183 |
| 4,764,582 | 8/1988 | Hisgen et al. | 528/183 |
| 4,788,272 | 11/1988 | Hisgen et al. | 528/170 |
| 4,792,597 | 12/1988 | Gaudiana et al. | 528/183 |
| 5,025,082 | 6/1991 | Kishiro et al. | 528/176 |

OTHER PUBLICATIONS

Patent Abstracts of Japan, vol. 11, No. 85 (C-410), 14 Mar. 1987; & JP-A-61 236 826 (Kurray) Nov. 22, 1986.
Patent Abstracats of Japan, vol. 13, No. 451 (C-643), 11 Oct. 1989; & JP-A-1 174 526 (Mitsubishi) Nov. 7, 1989.

Primary Examiner—John Kight, III
Assistant Examiner—T. Mosley

[57] ABSTRACT

An aromatic polyesteramide possessing thermotropic liquid crystalline polymer characteristics, which are easily workable in the molten state and have the mesogenic group in the main chain, are obtained by condensing possible substituted aminophenols and hydroquinone derivatives with aromatic dicarboxylic acids.

19 Claims, No Drawings

THERMOTROPIC POLYESTERAMIDES

FIELD OF THE INVENTION

This invention relates to aromatic polyesteramides having the characteristics of thermotropic liquid crystalline polymers, and the process for their preparation.

STATE OF THE ART

Thermotropic polyesteramides are widely described in the scientific and patent literature.

U.S. at. Nos. 4,182,842, 4,764,582 and 4,351,917 and European patent applications 298,883 and 272,992 describe particular monomer mixtures, all characterised in that the amide function is provided by structures deriving from para-aminobenzoic acid either alone or in mixture with its meta isomer.

U.S. Pat. Nos. 4,727,129 and 4,788,272 describe complex monomer mixtures used to obtain polyesteramide-imides.

U.S. Pat. Nos. 4,351,918, 4,339,375, 4,330,457 and 4,355,132 describe various polymer compositions in which the amide function is provided by aminophenols or aromatic diamines, said polymers being characterised by the presence of 2-hydroxy-6-naphthoic acid.

Other patents in which the amide function is provided by aminophenols state the need to lower the polymer melting point. This is obtained for example in U.S. Pat. No. 3,859,251 by using linear aliphatic carboxylic diacids with different aliphatic chain lengths. European patent application 7,715 describes polymers in which a particular chain asymmetry is introduced by the use of N-alkylaminophenols or particular diacids such as substituted terephthalic acids, 4-carboxyphenoxyacetic acid, 1,2-bis(p-carboxyphenoxy)ethane, 1,6-naphthalenedicarboxylic acid etc.

In European patent application 81900 the melting point is lowered by using substantial quantities of aminophenols, aminobenzoic acids or aromatic diamines in the meta form, or other non-linear compounds such as those deriving from diphenylsulphone.

U.S. Pat. No. 4,792,597 describes the preparation of easily heat-processed polyesteramides using trifluoromethylterephthalic acid and substituted p-aminophenols.

In U.S. Pat. No. 4,722,993 the polyesteramides derive from a mixture of hydroquinones, and m-aminophenol in stoichiometric proportion with dicarboxylic aromatic acids such as p-hydroxybenzoic acid, containing the unit deriving from p-hydroxybenzoic acid.

In U.S. Pat. No. 4,727,131 the polyesteramides derive from a mixture containing t-butylhydroquinone in combination with 4.4'-dihydroxydiphenyl in which the amide structure is due to p-aminobenzoic acid, p-aminophenol or p-phenyldiamine, again containing the unit derived from p-hydroxybenzoic acid.

In contrast to the preceding, in U.S. Pat. No. 4,816,555 the amide structure derives from m-aminophenol and/or m-aminobenzoic acid. Finally, in European patent application 230,550 the described polymers are derived from methylhydroquinone in combination with other aromatic diols, containing the unit derived from p-hydroxybenzoic acid where the amide unit is optional and is supplied mainly by aminophenol or diamine compounds in the meta form.

SUMMARY OF THE INVENTION

The present invention provides aromatic polyesteramides with thermotropic liquid crystalline polymer characteristics containing in their molecule units deriving from substituted hydroquinones, units deriving from possibly substituted aminophenols with the amino group in the meta or paraposition with respect to the hydroxyl, and units deriving from aromatic dicarboxylic acids. The invention also provides the process for preparing said polyesteramides.

DETAILED DESCRIPTION OF THE INVENTION

The present invention provides thermotropic liquid crystalline polyesteramides containing in the macromolecule:

a) at least one unit deriving from compounds of formula (I)

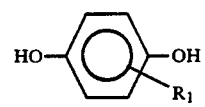

(I)

where $R_1$ is chosen from at least $C_5$ alkyl, at least $C_6$ cycloalkyl, at least $C_7$ aralkyl and $C_6-C_{12}$ aryl;

b) at least one unit deriving from compounds of formula (II)

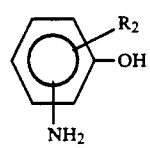

(II)

where the amino group is in the meta or para position relative to the hydroxyl and $R_2$ is chosen from hydrogen, $C_1-C_5$ alkyl, $C_6-C_{12}$ aryl, at least $C_7$ aralkyl, halogen or $C_1-C_5$ alkoxy;

c) at least one unit deriving from dicarboxylic acids of formula (III)

HOOC—A—COOH  (III)

where A is a single, double or condensed $C_6-C_{12}$ aryl radical possibly substituted with groups inert under reaction conditions such as halogens, $C_1-C_4$ alkyls or $C_1-C_5$ alkoxy groups.

The units deriving from hydroquinones of formula (I) are present in a quantity of between 50 and 95 mol% and preferably between 80 and 95 mol% with respect to the sum of the units deriving from hydroquinones and aminophenols of formula (II). The units deriving from dicarboxylic acids of formula (III) are present in a molar quantity equal to the sum of the units deriving from hydroquinones and aminophenols.

The present invention also provides the process for preparing said aromatic polyesteramides, comprising polycondensing compounds of formula (I) and compounds of formula (II) with compounds of formula (III).

Examples of hydroquinones of formula (I) are: phenylhydroquinone, phenylethylhydroquinone, phenylisopropylhydroquinone. t-pentylhydroquinone, cyclohexylhydroquinone etc. Examples of aminophenols of formula (II) are: p-aminophenol, m-aminophenol, 2-phenyl-4-aminophenol, 2-methyl-4-aminophenol, 3-methyl-4-aminophenol, 2-chloro-4-aminophenol, 3-chloro-4-aminophenol, etc.

Examples of dicarboxylic acids of formula (111) are: terephthalic acid, chloro or bromo-terephthalic acid, methylterephthalic acid, isophthalic acid, 1,4, 1,5 and 2,6-naphthalenedicarboxylic acid, 4,4'-diphenyldicarboxylic acid, 3,3'-dibromo-4,4'-diphenyldicarboxylic acid, cyclohexanedi-carboxylic acid, 4,4'-stilbenedicarboxylic acid etc.

The polymers according to the present invention are optically anisotropic in the molten state, as can be verified by optical microscopic analysis with polarized light.

They have an inherent viscosity of between 0.2 and 4 dl/g when measured in a 1:1 phenol/trichlorobenzene mixture at 85° C.

Their molecular weight and crystallinity can be increased by heating the polymer particles in an inert atmosphere or under vacuum to a temperature just below their melting point for a time of between 1 and 20 hours.

The polyesteramides of the present invention can be used to obtain formed objects preparable by common thermoplastic polymer transformation methods such as injection moulding or extrusion, they can be worked in film or fibre form, they can be used as matrices for composite fibre or inorganic filler based composite materials, and can be used in mixture with other polymers.

The aromatic liquid crystalline polyesteramides of the present invention can be prepared using conventional methods by reacting the said monomers of formula (1), (11) and (111), which are commercially available or easily prepared by the common methods of organic chemistry, under normal polyester resin preparation conditions.

For example, said polyesteramides can be obtained either in the molten state or in the presence of a dispersing medium of high boiling point such as diphenylsulphone or mixtures of partly hydrogenated terphenyls, by transesterification between aromatic dicarboxylic acids and phenol acetates or propionates, at a temperature between 270° and 370 C. to favour the complete development of the aliphatic carboxylic acids, possibly operating under vacuum. The acetates can also be prepared in situ by reacting the monomer mixture with acetic anhydride.

Optionally, the reaction can be conducted in the presence of a transesterification catalyst such as alkaline or alkaline earth metal phosphates.

Further catalysts can be those commonly used in polycondensation processes as illustrated in "Encyclopaedia of Polymer Science and Technology" (1969, vol. 10, pp. 722-723).

Examples of such catalysts are oxides, hydroxides, hydrides, halides, alcoholates or phenolates, organic or inorganic acid salts and complex salts of lithium, sodium, potassium, magnesium, calcium, titanium, manganese, cobalt, zinc, tin, antimony, lanthanum, cerium, lead and germanium.

The required catalyst quantity is between 0.005 and 1 mol%. and preferably between 0.01 and 0.2 mol%. calculated on the total reagent quantity.

According to an alternative method, the liquid-crystalline aromatic polyesteramides of the present invention are obtained in solution by polycondensation between aromatic dicarboxylic acid halides and the phenol/aminophenol mixture in a suitable solvent. The temperature is between 25 and 220° C and the reaction is conducted in the presence of a base and/or a nitrogen stream to facilitate elimination of the hydrohalogen acid.

Pyridine is the preferred base, and the preferred solvents include aliphatic and aromatic chlorinated solvents such as methylene chloride, chlorobenzene, dichlorobenzenes and trichlorobenzenes.

The monomers of formula (I). (II) and (III) can be made to react simultaneously, or firstly the aminophenols can be made to react with the dicarboxylic acid halides, after which the hydroquinone derivatives are added.

The polymer obtained in this manner is then recovered by evaporating the solvent or by precipitation with a non-solvent followed by filtration.

Some non-limiting examples are given hereinafter to allow better understanding and implementation of the invention. In all the examples the melting point is measured by DSC (differential scanning calorimeter) with scanning at 20° C. per minute, and the inherent viscosity is measured in a 1:1 phenol/trichlorobenzene mixture at 85° C. at a concentration of 2.5 g/l.

EXAMPLE 1

0.41 g (3.8 mM) of p-aminophenol in 80 ml of 1,2,4-trichloro-benzene are fed under a nitrogen stream into a 250 ml flask fitted with a mechanical stirrer, condenser and nitrogen inlet tube. The mixture is heated to 140° C. after which 7.66 g (37.7 mM) of terephthalic acid dichloride are added. The mixture is heated under reflux for 2 hours, when HCl development practically ceases. A mixture of 2.81 g (15.2 mM) of phenylhydroquinone and 4.04 g (18.9 mM) of phenylethylhydroquinone dissolved in 60 ml of trichlorobenzene is then added. The mixture is heated under reflux for 14 hours, when HCl development practically ceases. All the aforesaid operations are conducted in a nitrogen stream. The mixture is allowed to cool to 50° C. after which it is poured into acetone and the precipitate filtered off. The polymer obtained is washed with acetone, hot water and finally with acetone-methanol. After drying under vacuum for 5 hours at 180° C. 12.06 g of product are obtained (yield 98.5%). The polymer is ground, further washed and dried. In this manner a product is obtained which melts at 335° C. and has an inherent viscosity of 0.99 dl/g. Elemental analysis shows 0.43% of nitrogen present.

EXAMPLE 2

0.72 g (3.6 mM) of 4-amino-2-phenylphenol in 85 ml of 1,2,4-trichlorobenzene are fed into the apparatus of Example 1. Following the procedure described in Example 1, 7.29 g (35.9 mM) of terephthalic acid dichloride are added followed after 2 hours under reflux by a mixture of 2.67 g (14.4 mM) of phenylhydro-quinone and 3.85 g (17.9 mM) of phenylethylhydroquinone dissolved in 60 ml of trichlorobenzene. The mixture is kept at reflux temperature for about 9 hours after which the procedure described in Example 1 is followed to obtain 10.91 g of polymer (yield 91.7%). The polymer shows a melting point of 345° C. and an inherent viscosity of 1.42 dl/g. By heating under vacuum for 6 hours at 300° C. a polymer is obtained having the same melting point but with a viscosity of 3.0 dl/g. Elemental analysis shows 0.42% of nitrogen present.

EXAMPLE 3

0.38 g (3.5 mM) of m-aminophenol in 80 ml of trichlorobenzene are fed into the apparatus of Example 1. Following the procedure described in Example 1, 7.12 g (35 mM) of terephthalic acid dichloride are added followed after 1.5 hours under reflux by a mixture of 2.61 g (14 mM) of phenylhydroquinone and 3.76 g (17.5 mM) of phenylethylhydroquinone dissolved in 60 ml of trichlorobenzene. The mixture is kept at reflux temperature for 8.5 hours after which the procedure described in Example 1 is followed. 10.55 g of polymer (yield 93.2%) melting at 312° C. are obtained.

EXAMPLE 4

1.46 g (7.3 mM) of 4-amino-2-phenylphenol in 80 ml of 1,2,4-trichlorobenzene are fed into the apparatus of Example 1. Following the procedure described in Example 7.46 g (36.7 mM) of terephthalic acid dichloride are added followed after 1.5 hours under reflux by a mixture of 2.05 g (11.0 mM) of phenylhydro-quinone and 3.93 g (18.4 mM) of phenylethylhydroquinone dissolved in 70 ml of trichlorobenzene. The mixture is kept at reflux temperature for about 9 hours after which the procedure described in Example is followed to obtain 10.84 g of polymer (yield 88.6%). The polymer melts at 340° C. and has an inherent viscosity of 0.60 dl/g.

EXAMPLE 5

0.37 g (3.4 mM) of m-aminophenol in 80 ml of trichlorobenzene are fed into the apparatus of Example 1. Following the procedure described in Example 1, 6.88 g (33.9 mM) of terephthalic acid dichloride are added followed after 2 hours under reflux by 6.53 g (30.5 mM) of phenylethylhydroquinone dissolved in 60 ml of trichlorobenzene. The mixture is kept at reflux temperature for about 8 hours after which the procedure described in Example 1 is followed to obtain 10.69 g of polymer (yield 94.6%). The polymer melts at 326° C. and has an inherent viscosity of 1.31 dl/g.

EXAMPLE 6

3.76 g (18.5 mM) of terephthalic acid dichloride, 1.98 g (9.2 mM) of phenylethylhydroquinone, 1.69 g (7.4 mM) of phenylisopropylhydroquinone and 0.34 g of 4-amino-2-phenylphenol in 155 ml of trichlorobenzene are fed under a nitrogen stream into the apparatus of Example 1. The mixture is gradually heated to reflux temperature and maintained at this temperature for 14 hours, when HCl development practically ceases. All operations are carried out under a nitrogen stream. The procedure described in Example 1 is followed to obtain 5.68 g of polymer (yield 88.5%) The polymer shows a melting point of 33° C. and an inherent viscosity of 1.12 dl/g.

EXAMPLE 7

7.23 g (35.7 mM) of terephthalic acid dichloride, 3.82 g (17.8 mM) of phenylethylhydroquinone, 2.65 g (14.3 mM) of phenylhydroquinone and 0.44 g (3.6 mM) of 4-amino-metacresol dissolved in 140 ml of trichlorobenzene are fed under a nitrogen stream into the apparatus of Example 1. The procedure described in Example 1 is followed maintaining the mixture under reflux for 8 hours, to obtain 10.41 g of polymer (yield 90.2%) melting at 326° C.

EXAMPLE 8

15.37 g (92.5 mM) of terephthalic acid. 17.84 g (83.3 mM) of phenylethylhydroquinone, 1.01 g (9.2 mM) of p-aminophenol and 20 ml of acetic anhydride are fed under a nitrogen stream into a 100 ml flask fitted with a mechanical stirrer, nitrogen inlet tube and distillation head. The temperature is gradually raised to 150° C. This temperature is maintained for 1 hour after which the acetic acid is distilled off for a further hour. The temperature is then lowered to 20° C. over a period of 30 minutes, and after a further 30 minutes is raised to 340° C. over a period of 1 hour distilling off acetic acid. This temperature is maintained for 15 minutes after which the mixture is allowed to cool to ambient temperature. The solid obtained is ground and washed with acetone, hot water and acetone/methanol. After drying under vacuum for 5 hours at 180° C. a polymer is obtained having a melting point of 355° C. and an inherent viscosity of 0.31 dl/g. By heating to 100° C. under high vacuum a polymer is obtained the thermal decomposition of which commences slowly above 400° C. and which shows an inherent viscosity of 4 dl/g.

Elemental analysis shows 0.52% of nitrogen present.

EXAMPLE 9

13.76 g (82.8 mM) of terephthalic acid. 15.98 g (74.5 mM) of phenylethylhydroquinone, 0.9 g (8.3 mM) of m-aminophenol and 18 ml of acetic anhydride are fed into the apparatus of Example 8. The procedure described in Example 8 is followed to obtain a polymer having a melting point of 337° C. and an inherent viscosity of 0.24 dl/g measured as described in Example 1. By heating to 275° C. under high vacuum a polymer is obtained the thermal decomposition of which commences slowly above 400° C. and which shows an inherent viscosity of 4 dl/g. Elemental analysis shows 0.45% of nitrogen present.

We claim:

1. An aromatic polyesteramide having thermotropic liquid crystal properties, with an inherent viscosity of between 0.2 and 4 dl/g when measured in a 1:1 phenol/1,2,4-trichlorobenzene mixture at 85° C. at a concentration of 2.5 g/l, the macromolecule consisting essentially of:

at least one unit deriving from compounds of formula (I)

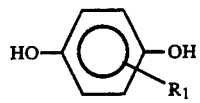

(I)

where $R_1$ is at least $C_5$ alkyl, at least $C_6$ cycloalkyl, at least $C_7$ aralkyl or $C_6$–$C_{12}$ aryl;

at least one unit deriving from compounds of formula (II)

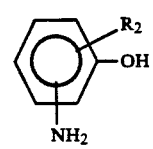

(II)

where the amino group is in the meta or para position relative to the hydroxyl and $R_2$ is chosen from hydrogen, $C_1$-$C_5$ alkyl, $C_6$-$C_{12}$ aryl, at least $C_7$ aralkyl, halogen or $C_1$-$C_5$ alkoxy;

at least one unit deriving from dicarboxylic acids of formula (III)

$$HOOC-A-COOH \qquad (III)$$

where A is a $C_6$-$C_{12}$ aryl radical possibly substituted with halogens, $C_1$-$C_4$ alkyls or $C_1$-$C_5$ alkoxy groups.

2. A polyesteramide as claimed in claim 1, wherein the units deriving from the compounds of formula (I) are present in a quantity of between 50 and 95 mol% with respect to the sum of the units deriving from the compounds of formula (I) and (II), and the units deriving from the compounds of formula (III) are present in a molar quantity equal to the sum of the units deriving from the compounds of formula (I) and (II).

3. A polyesteramide as claimed in claim 2, wherein the units deriving from the compounds of formula (I) are present in a quantity of between 80 and 95 mol% with respect to the sum of the units deriving from the compounds of formula (I) and (II).

4. A polyesteramide as claimed in claim 1, wherein the compounds of formula (I) are phenylhydroquinone, phenylethylhydroquinone, phenylisopropylhydro-quinone, t-pentylhydroquinone, cyclohexylhydroquinone and mixtures thereof.

5. A polyesteramide as claimed in claim 4, wherein the compound of formula (I) is phenylethylhydroquinone.

6. A polyesteramide as claimed in claim 4, wherein the compound of formula (I) is a mixture of phenylethylhydro-quinone and phenylhydroquinone.

7. A polyesteramide as claimed in claim 4, wherein the compound of formula (I) is a mixture of phenylethylhydro-quinone and phenylisopropylhydroquinone.

8. A polyesteramide as claimed in claim 1, wherein the compounds of formula (II) are chosen from p-amino-phenol, m-aminophenol, 2-phenyl-4-aminophenol, 2-methyl-4-aminophenol, 3-methyl-4-aminophenol, 2-chloro-4-aminophenol, 3-chloro-4-aminophenol or mixtures thereof.

9. A polyesteramide as claimed in claim 8 wherein the compound of formula (II) is p-aminophenol.

10. A polyesteramide as claimed in claim 8, wherein the compound of formula (II) is m-aminophenol.

11. A polyesteramide as claimed in claim 8, wherein the compound of formula (II) is 2-phenyl-4-aminophenol.

12. A polyesteramide as claimed in claim 8, wherein the compound of formula (II) is 4-aminometacresol.

13. A polyesteramide as claimed in claim 1, wherein the compounds of formula (III) are chosen from terephthalic acid, chloro-terephthalic acid, bromo-terephthalic acid, methylterephthalic acid, isophthalic acid, 1,4, 1,5 and 2,6-naphthalenedicarboxylic acid, 4,4'-diphenyldicarboxylic acid, 3,3'-dibromo-4,4'-diphenyldicarboxylic acid, cyclohexanedicarboxylic acid, 4,4'-stilbenedicarboxylic acid or mixtures thereof.

14. A polyesteramide as claimed in claim 13, wherein the compound of formula (III) is terephthalic acid.

15. A process for preparing a polyesteramide claimed in claim 1, consisting of polycondensation between the halides of the acids of formula (III) and the compounds of formula (I) and formula (II) in an inert solvent at a temperature of between 25° and 220° C. in the presence of a base and/or a nitrogen stream.

16. A process as claimed in claim 15, wherein the inert solvent is methylene chloride, chlorobenzene, dichlorobenzene or trichlorobenzene.

17. A process as claimed in claim 15, wherein the polycondensation is conducted by firstly reacting halides of the acids of formula (III) with the compounds of formula (II) and then adding the compounds of formula (I).

18. A process for preparing a polyesteramide claimed in claim 1, consisting of transesterification between a compound of formula (III) and an ester-amide of acetic or propionic acid with a compound of formula (I) and (II) at a temperature of between 270° and 370° C.

19. A process as claimed in claim 18, wherein the ester-amide of acetic acid is prepared in situ by heating the mixture of compounds of formula (I) and (II) with acetic anhydride at a temperature of between 100° and 150° C.

* * * * *